United States Patent
Björn et al.

(10) Patent No.: US 6,714,222 B1
(45) Date of Patent: Mar. 30, 2004

(54) GRAPHICAL USER INTERFACE FOR COMMUNICATIONS

(75) Inventors: Staffan Björn, Stockholm (SE); Didier Chincholle, Hägersten (SE); Adam Fjaestad, Stockholm (SE); Arne Stjernholm Madsen, Copenhagen (DK); Karl Mattsson, Stockholm (SE); Jonathan Young, Stockholm (SE); Håkan Åkerberg, Hässelby (SE)

(73) Assignee: E2 Home AB, Stockholm (SE)

( * ) Notice: Subject to any disclaimer, the term of this patent is extended or adjusted under 35 U.S.C. 154(b) by 404 days.

(21) Appl. No.: 09/598,391

(22) Filed: Jun. 21, 2000

(51) Int. Cl.[7] .................................................. G06F 3/00
(52) U.S. Cl. ...................................... 345/839; 345/773
(58) Field of Search ................................ 345/702, 863, 345/864, 769, 767, 821–824, 773, 774–778, 779, 744–747, 839, 847, 473, 474, 776, 771–772

(56) References Cited

U.S. PATENT DOCUMENTS

| | | | |
|---|---|---|---|
| 5,276,795 A | | 1/1994 | Hoeber et al. |
| 5,367,623 A | | 11/1994 | Iwai et al. |
| 5,717,433 A | | 2/1998 | Doba |
| 5,760,773 A | | 6/1998 | Berman et al. |
| 5,852,436 A | * | 12/1998 | Franklin et al. ............ 345/867 |
| 6,243,071 B1 | * | 6/2001 | Shwarts et al. ............ 345/776 |
| 6,344,861 B1 | * | 2/2002 | Naughton et al. .......... 345/769 |
| 6,396,517 B1 | * | 5/2002 | Beck et al. ................. 345/771 |
| 6,452,615 B1 | * | 9/2002 | Chiu et al. ................. 345/776 |

FOREIGN PATENT DOCUMENTS

| | | |
|---|---|---|
| EP | 0480859 A2 | 4/1992 |
| EP | 0617357 A1 | 9/1994 |
| WO | WO98/16894 | 4/1998 |

OTHER PUBLICATIONS

Tom Spring, "Post Snapshots on Your Online Refrigerator," PC World, Nov. 27, 1998.

"Medianote: An Easy Way to See Multimedia Notes," IBM Technical Disclosure Bulletin, U.S., IBM Corp. New York, vol. 34, No. 6, Nov. 1, 1991, pp. 34–35.

Bansal, Ravi et al: "A User Interface for a Home–Messaging Center on a Refrigerator Screen", Department of Computer Science, University of Colorado at Boulder, CSCI 6838, May 12, 2000.

ELECTROLUX: "Screenfridge" [on line]. Feb. 1999.

* cited by examiner

Primary Examiner—Steven Sax
(74) Attorney, Agent, or Firm—Burns, Doane, Swecker & Mathis, L.L.P.

(57) ABSTRACT

A graphical user interface provides access to communications and other applications in a home environment by utilizing icons that are consistent with a refrigerator/magnet metaphor. A background is displayed on a touch screen, and one or more virtual magnets are displayed on the background. The virtual magnets may be dragged to new locations by a user. Tapping on a virtual magnet activates a corresponding application. The virtual magnets can further exhibit magnetic properties, such as alternatively repelling or attracting one another. When an application is activated, an application window is made to appear on the background, preferably in the form of a sheet of paper. The corresponding virtual magnet can be made to appear to be affixing the sheet of paper to the background, thereby reinforcing the refrigerator/magnet metaphor.

54 Claims, 6 Drawing Sheets

GRAPHICAL USER INTERFACE FOR COMMUNICATIONS

BACKGROUND

The present invention relates to graphical user interfaces, and more particularly to graphical user interfaces that are particularly useful for providing access to family-oriented communications applications.

Communications in one form or another have long played a part in the day-to-day home life of individuals and families. These communications might simply be messages to oneself, such as recipes and shopping lists, or they may be intended to communicate information from one person to another (or others), either within the same household or to someone outside the house.

Various types of communication devices have been made available for the purpose of making the intended communication easier, faster and/or more efficient. Fax machines and personal computers (PCs) are examples of such devices. By and large, however, these devices are designed for use in office-like settings. Thus, for example, a PC usually requires enough desk space to hold a keyboard and monitor, and possibly also a base unit that houses the computer motherboard.

It is possible to incorporate some of the office-oriented equipment into the home for use there as well. Often this involves setting up an area of the home that becomes a "home office" space (either a separate room, or a portion of a room) that is used for home office-related activities. Consequently, to make use of this home equipment, one must make an effort to go to the home office space.

Lifestyles typically do not center around the home office space, however. One consequence of this is that one might at times feel disinclined to make use of the equipment because it feels like too much of an effort. Thus, for example, one might put off entering recipes into a computerized recipe organizer, or might avoid going into the home office and turning on the computer just to look up a telephone number that is stored on the PC's hard drive because going to the home office space might mean isolating oneself from the center of activity in the household. Moreover, because the home office space is often not used for other purposes, family members cannot reliably leave messages there for other family members because there is no assurance that the message will be noticed (i.e., there is no assurance that the intended recipient(s) of the message will go to the home office space, thereby enabling them to see the message).

One could attempt to solve this problem by moving the communications equipment into a location that would make it more readily accessible to family members in their normal day-to-day lives. However, such a solution is problematic for several reasons. First, as mentioned above, conventional equipment often requires more space (e.g., table space and the like) than most family rooms can accommodate without at least compromising the decor of the room. Moreover, many household occupants do not feel comfortable with, or are otherwise intimidated by conventional equipment such as PCs, which can often require knowledge of how to boot up a system, how to select and launch programs, and how to gracefully shut down a system. Put another way, the operating systems of conventional systems provide a user interface that is out of place in a home setting. Rather than interacting with the equipment in a way that feels natural, the user instead has to perform actions associated with a desktop metaphor.

There is therefore a need to provide communications methods and apparatuses that are suitable for use in a home setting, and which more naturally fit into existing home life behaviors.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that generate a graphical user interface. In one aspect, this includes displaying a background on a touch screen; displaying a first virtual magnet on the background; relocating the first virtual magnet from a first location on the background to a second location on the background in response to a drag operation performed on the first virtual magnet by a user; and activating an application program in response to a tap operation performed on the first virtual magnet by the user. Thus, virtual magnets are like real magnets in that they can be placed where the user would like them to appear.

The graphical user interface can also be made to display an application window on the background in response to the tap operation performed on the first virtual magnet by the user. In some, but not necessarily all, embodiments, the application window can be made to appear to be a sheet of paper. In some other alternatives, the application window can be made to appear to be a plurality of sheets of paper, wherein each one of the sheets of paper has a tab portion that indicates one of a corresponding plurality of applications that can be activated.

Although it is not essential to the invention, the graphical user interface can move the virtual magnet from a main page location to an application window location in response to the tap operation performed on the first virtual magnet by the user, wherein the application window location is such that part of the virtual magnet covers a portion of the application window and a remaining part of the virtual magnet covers a portion of the background, thereby creating the illusion that the virtual magnet is affixing the application window to the background. In some embodiments it is also possible, at this point, to move other virtual magnets to positions alongside the application window. This permits the other virtual magnets to continue to be viewed by the user.

Another feature that can be included in the graphical user interface is terminating the application in response to a second tap operation being performed on the first virtual magnet by the user. In addition to terminating the application, the application window should be removed from the background; and the first virtual magnet can be returned to the main page location. If the other virtual magnets were moved alongside the application window when the application was activated, then terminating the application can also include returning them to their earlier-held positions on the background.

In other non-essential aspects of the invention, the magnet metaphor can be enhanced by performing any combination of the following. A predetermined sound (e.g., a "click") can be generated in response to a peripheral region of one virtual magnet coming into contact with a peripheral region of another virtual magnet. Virtual magnets can be made to repel one another when a peripheral region of one virtual magnet is less than a predetermined distance from a peripheral region of another virtual magnet. The repelling operation causes the two virtual magnets to be moved such that they are at least the predetermined distance away from each other. Alternatively, virtual magnets can be made to attract one another, whereby two or more virtual magnets are moved such that a peripheral region of one is made to be in contact with the peripheral regions of the others. The movement of virtual magnets when attracted or repelled can be uniform for all virtual magnets, or alternatively can be made to vary as a function of relative masses (or weights) associated with virtual magnets.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with respect to the figures, in which like parts are identified with the same reference characters.

These and other aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

As mentioned earlier, there is a need to provide communications methods and apparatuses that are suitable for use in a home setting, and which more naturally fit into existing home life behaviors. In addressing this problem, the inventors have recognized that in many households, the kitchen is the focal point of family activity. That is, people congregate in the kitchen when meals are being prepared, when informal meals are consumed, and afterwards when the cleanup is performed. Furthermore, the refrigerator has long been used as a primitive form of communications center for household activities with various lists, messages, drawings and photographs being held thereon by magnets or other means. Accordingly, the invention provides methods and apparatuses suitable for establishing and maintaining the kitchen as the communications center for everyday household management. In part, this is preferably brought about by equipment that includes a processor and an input/output (IO) device.

To ensure that the equipment is not out of place in the kitchen setting, the invention provides for a Graphical User Interface (GUI) that utilizes a refrigerator as a metaphor. As mentioned above, the refrigerator has already been used as a kind of communications center. Thus, the provision of a GUI having a refrigerator as a metaphor provides a mechanism for interacting with the communications equipment in a way that feels natural and familiar to each household occupant.

An important aspect of the GUI in accordance with the invention is the provision of one or more icons that each are representative of, and have one or more characteristics of, magnets. These icons are henceforth referred to as virtual magnets. The reason for choosing magnets as an icon type is because, in the real world, magnets are often utilized to affix various items (e.g., lists, drawings, photographs, messages) to one or more sides of a refrigerator, thereby turning the refrigerator into a bulletin board of sorts. Thus, if an I/O device having the inventive GUI were to be mounted on a refrigerator, or similar appliance housing, a user would feel comfortable with the icon manipulation techniques required for its utilization.

In a preferred embodiment of the invention, the I/O device is a color touch screen, although this aspect is not essential for practicing the invention: any I/O device capable of displaying the various icons described here, and of providing a mechanism for manipulating them (e.g., moving and selecting icons via a mouse or keyboard or remote control device or voice recognition technology) could alternatively be used. The GUI is capable of displaying metaphors of the physical world. In particular, the GUI displays one or more virtual magnets. To enhance the metaphor, it is preferred, although not essential, that the virtual magnets be displayed on a neutral background (e.g., one that would blend in well with a refrigerator), and that three dimensional (3D) graphics be used to represent them. The GUI may additionally display other metaphors of the real world, such as self-sticking "yellow notes". It is preferred that the GUI be designed to create a look and feel of the familiar situation that one is confronted with when standing in front of a refrigerator in a kitchen.

In another aspect of the invention, the virtual magnets function as activation buttons for one or more applications that are run by the processor associated with the I/O device. The particular applications that should be made available through the inventive GUI are implementation dependent, so a specification of these is beyond the scope of the invention. However, for purposes of illustration, such applications may (but need not) include any of the following: a family message application that creates virtual self-sticking "yellow notes" for leaving notes to oneself or other household members (the virtual "yellow notes" would be displayed on the same screen as the virtual magnets); a calendar application for organizing the schedules of household members; a recipe organizer; a shopping list application that, optionally, can also facilitate locating and/or purchasing the listed items from vendors via the Internet; television; radio; news and other text/audio/video information on demand (e.g., available via the Internet or another server); telephone; an address/phone book application; email; and appliance control functions (e.g., appliances other than the refrigerator, such as washing machine and furnace temperature control).

Figure 1:
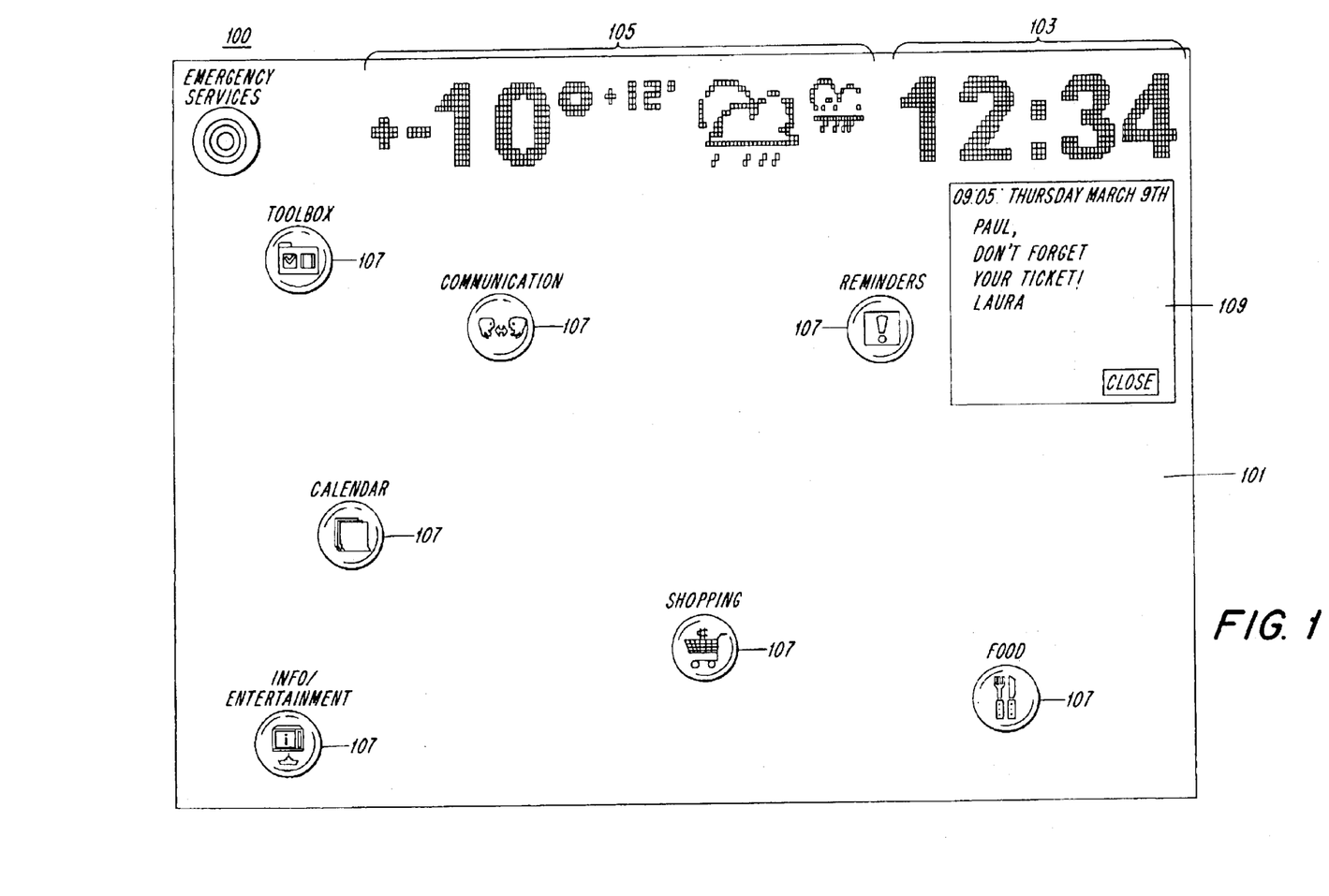
FIG. 1 illustrates an exemplary embodiment of a "main page" of the GUI in accordance with the invention.

FIG. 1 illustrates an exemplary embodiment of a "main page" 100 of the GUI. In the exemplary embodiment, this page is displayed on a computer touch screen having an aspect ratio of 4:3 (width:height), although these selections are not essential features of the invention. Being a touch screen, the input device is neither a keyboard nor a mouse, although similar functions can be achieved. Instead, the screen (which is also the display device) is touch-sensitive, which allows finger-touch interaction. Such screens are known in the art, and need not be described here in detail.

The background 101 is preferably given a neutral visual effect, such as generally being colored a light gray with a grid of horizontal and vertical lines depicted in white so as to leave the impression of some kind of board.

In a predefined area of the screen, such as the upper part, some general information may be displayed in a moderate gray color. This information may include, for example, the current time 103 (and perhaps date, not shown) and weather forecast 105. The weather forecast may be presented by means of pictograms (e.g, a sun, a cloud, etc.). All of this general information is preferably depicted as two-dimensional (2D) text or graphics, which are subordinated to the grid of white lines in the background 101, so that the general information will appear to be a part of the background board.

Scattered about the rest of the board are a number of virtual magnets, generally referred to by reference number 107. In the exemplary embodiment depicted in FIG. 1, the virtual magnets 107 have circular shapes with a pictogram in the center. The pictogram is useful for informing the viewer of the function of the particular virtual magnet 107, as will be described in greater detail below. The image of each virtual magnet 107 on the touch screen includes 3D effects, such as light and shadow, so that each virtual magnet 107 gives the illusion of being a real magnet that has been placed on the board. The particular shape and colors of the virtual magnets 107 are not essential to the invention. In alternative embodiments, the virtual magnets 107 could have many different shapes and colors, thus imitating magnets in the real kitchen environment. In some alternative embodiments, the pictograms can be replaced by giving each virtual magnet 107 one of a number of unique shapes to indicate which of a corresponding number of functions the particular virtual magnet 107 can perform.

Referring back to the exemplary embodiment depicted in FIG. 1, somewhere in proximity to each virtual magnet 107 (e.g., above or below the virtual magnet 107) is a short written title, which may be the label of the application associated with the virtual magnet 107, or even just a number associated with the virtual magnet 107 for the purpose of distinguishing it from other magnets. These labels are supplementary to the pictograms depicted in the middle of the virtual magnet 107, and need not be provided in all embodiments.

Other images may also appear on the board. For example, where a sticky yellow note application has been provided, one or more yellow notes 109 may appear on the board. These may be small areas on the screen that are given a modest yellow color, on which either some text or a picture will be displayed. At a predefined area of the yellow note 109 (e.g., at the top of the yellow note 109) there may appear a smaller text display to indicate the time and/or date on which the yellow note 109 was created. In preferred embodiments, the image of the yellow notes 109 includes aspects (e.g., lighting, shading) that give the yellow note 109 a 3D-like appearance. Again, this is to increase the illusion that the user is dealing with real physical objects.

Figure 2:
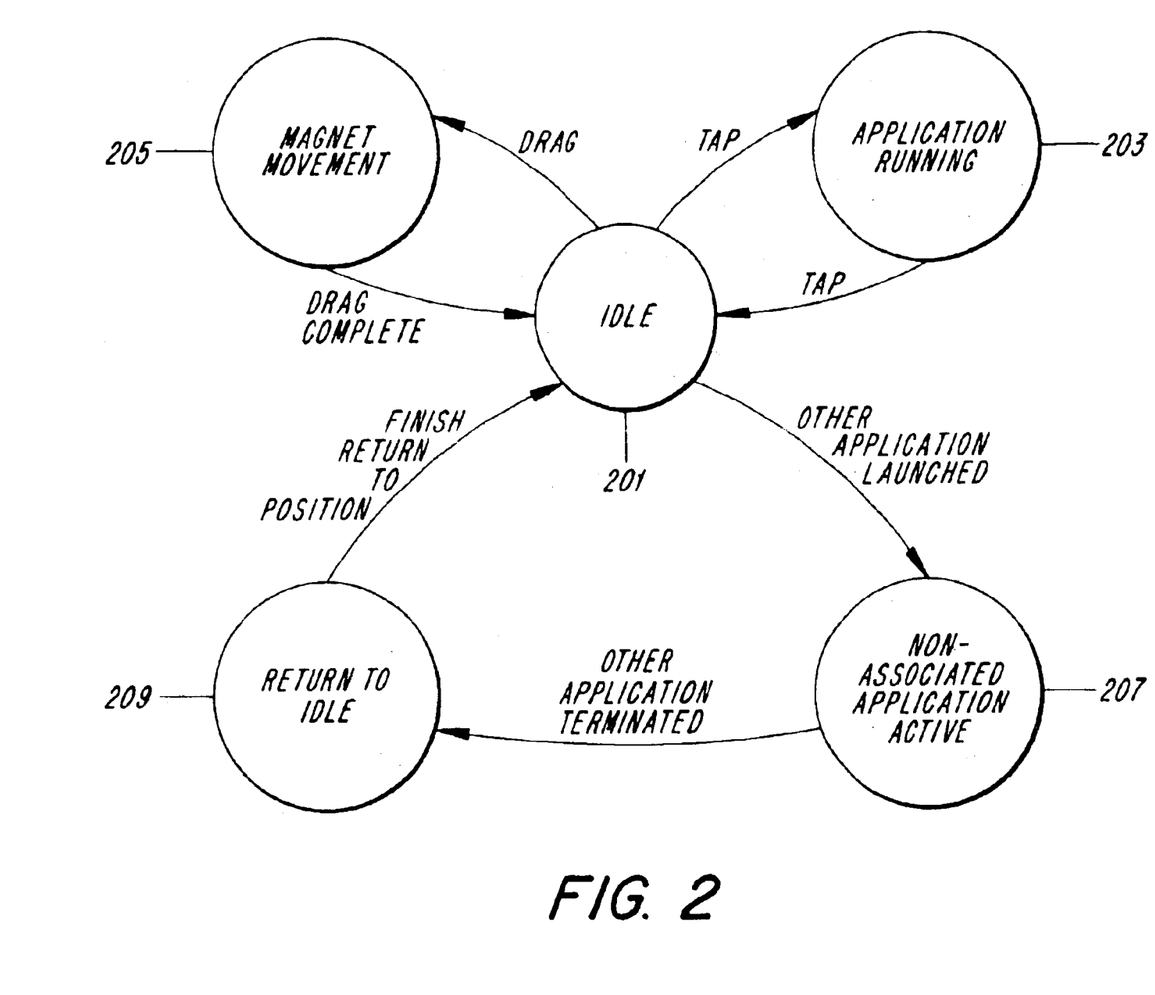
FIG. 2 is a state transition diagram that shows the high level design of a virtual magnet in accordance with an exemplary embodiment of the invention.

The logic that generates each virtual magnet 107 is preferably a set of program instructions that are executed on a processor associated with the touch screen. FIG. 2 is a state transition diagram that shows the high level design of a virtual magnet 107. The default state of a virtual magnet 107 is an idle state 201. In idle state 201, the virtual magnet is 107 merely displayed on the touch screen.

Transitions in state are made in response to various interactions that a user can have with the touch screen. One kind of interaction is a "tap", which may involve the user touching the surface of the touch screen (e.g., with a finger or other implement—In this example, a finger is assumed) and then lifting off from the touch screen surface without having moved the finger from its initial point of contact with the touch screen. Where the user interaction is accomplished via a remote control device, the tap might be accomplished by first selecting the desired virtual magnet 107 (e.g., by pressing a numbered key on the remote control device that corresponds to a number associated with the virtual magnet 107) and then selecting a control key associated with the tap command. Where the user interaction is accomplished via voice recognition technology, the user may first select the desired virtual magnet 107 by speaking a number or label associated with the virtual magnet 107 (e.g., "3" or "shopping"), followed by another word to indicate the command (e.g., "tap" or "activate").

When the user taps an area of the touch screen upon which a virtual magnet 107 is displayed (henceforth referred to as tapping a virtual magnet 107), the logic that controls the GUI determines that the tapped virtual magnet 107 is in the idle state 201, and in response to the tap launches an application that has been associated with the virtual magnet 107, and changes the touch screen image so that instead of displaying the main page 100, a subordinate page is displayed. The virtual magnet 107 is now in an "Application Running" state 203, which preferably causes the virtual magnet 203 to be displayed at a predefined position on a subordinate page. The particular information conveyed by the subordinate page is application specific, and so cannot be defined here. However, a preferred format for displaying a subordinate page is described in greater detail later on in this disclosure. When the user terminates the application (e.g., by again tapping the virtual magnet 107), the state returns to the idle state 201.

Another interaction that the user can have with the touch screen is a "drag", which involves touching the virtual magnet (e.g., with the finger or other implement—In this example, a finger is assumed), and without lifting the finger from the touch screen, moving the finger to a different location on the touch screen. The drag is complete when the user lifts the finger from the touch screen. Where the user interaction is accomplished via a remote control device, the drag might be accomplished by first selecting the desired virtual magnet 107 (e.g., by pressing a numbered key on the remote control device that corresponds to a number associated with the virtual magnet 107) and then selecting a control key associated with the desired dragging motion. In this case, the drag command can be terminated by the user's releasing the motion command key. Where the user interaction is accomplished via voice recognition technology, the user may first select the desired virtual magnet 107 by speaking a number or label associated with the virtual magnet 107 (e.g., "3" or "shopping"), followed by another word to indicate the desired motion (e.g., "move left").

Like magnets on a real refrigerator, the virtual magnets 107 are moveable. This means that the virtual magnets 107 are not forced to remain in fixed or default positions on the main page 100 of the GUI. Rather, the user can use the drag interaction to move a virtual magnet 107 to a different position of the object. Thus, in FIG. 2, it can be seen that a virtual magnet 107 in the idle state 201 will transition to a magnet movement state 205 in response to a drag operation. When the drag operation is complete (i.e., when the finger is lifted away from the touch screen surface), the virtual magnet 107 leaves the magnet movement state 205 and returns to the idle state 201. The position of the virtual magnet 107 remains substantially where the user left it, subject to possible adjustments made by the magnet movement state 205. These adjustments will now be described.

To enhance the refrigerator magnet metaphor, the magnet movement state 205 may impose restrictions and characteristics on the movements of virtual magnets 107. Thus, in preferred embodiments:

Virtual magnets 107 cannot be moved outside the screen area.

One virtual magnet 107 cannot be moved to a position that covers any part of another magnet. At most, virtual magnets 107 can be made to contact one another at their borders. To increase the illusion that the user is working with real magnets, preferred embodiments incorporate sound effects that include the playing of an audible clicking sound when two virtual magnets 107 first come into contact with one another.

Virtual magnets 107 are characterized by a magnetic property that can cause two magnets that are very close to one another (e.g., within 1 centimeter distance from one another) to alternatively attract one another (i.e., the virtual magnets 107 will automatically move quickly towards each other (or one virtual magnet 107 will move towards another that is "held" in place by user interaction) until they contact one another) or repel one another (i.e., the virtual magnets 107 will automatically move quickly away from each other (or one virtual magnet 107 will move away from another that is "held" in place by user interaction) until a predetermined distance of, e.g., 1 centimeter is reached). Whether virtual magnets attract or reject each other can be determined at random, or alternatively can be determined by default settings for each of the virtual magnets 107.

A virtual magnet can be dragged to a spot that covers a yellow note 109.

Different virtual magnets 107 can be assigned different virtual masses or weights that give them different properties when moved and when they interact with one another. For example, a "lighter" virtual magnet 107 can be made to move more quickly than a "heavier" virtual magnet 107 when the two interact with one another magnetically (i.e., when attracting or repelling one another). This virtual weight can be made constant, or in some embodiments could be made a function of the number of functions or other applications associated with the virtual magnet 107 (e.g., the more functions associated with the virtual magnet, the "heavier" it is). For example, if one virtual magnet 107 is made to appear to be "holding" or otherwise associated with several shopping lists, it could be made to behave as a "heavier" object than one that "holds" only one shopping list. In a related, optional feature, the user can be given access to a "settings" function that permits him or her to set the weights and/or other magnetic properties of some or all of the virtual magnets 107.

Another virtual magnet state, called the "non-associated application active" state 207, is entered in response to activation of an application other than the one the virtual magnet 107 is associated with. In the "non-associated application active" state 207, the virtual magnet 107 is automatically repositioned to a predefined default position. The particular default position is implementation dependent, and is not essential to the invention. An exemplary default position is described in greater detail below in connection with an exemplary embodiment of a subordinate page. Alternatively, the new position to which any given virtual magnet 107 is repositioned upon entering the "non-associated application active" state 207 may be made a function of its current (main page) position. For example, it may be alternatively repositioned to the left or the right of the subordinate page, depending on whether the virtual magnet 107 was to the left or the right of center on the main page. The height of the magnet in its repositioned location may also be made a function of the virtual magnet's current (main page) position (e.g., the height may be left relatively unchanged, at least relative to other virtual magnets 107).

When the non-associated application is terminated (and no other non-associated applications are launched), the virtual magnet 107 leaves the "non-associated application active" state 207 and enters the "return to idle" state 209. The "return to idle" state 209 is a transitory state which serves only to return the virtual magnet 107 to the screen position that it had just prior to entering the "non-associated application active" state 205. After the virtual magnet 107 has returned to its former position on the main page 100, its state returns to the idle state 201.

The logic that controls the GUI may also give the yellow notes 109 a set of characteristic behaviors that will enhance the refrigerator metaphor. This behavior is illustrated by the state transition diagram shown in FIG. 3. When not being activated or moved by a user, a yellow note 109 remains in an idle state 301. While in idle state 301, relatively short text messages may be displayed, so that no action is required of the user to read the message from the main page 100. If the message is short enough, it may fit in its entirety in this format. However, longer text messages may have only a first portion of the text displayable from the main page 100, with the remainder requiring an action by the user in order for it to be displayed. In response to a tap, the yellow note 109 transitions from idle state 301 to a display/play state 303, which displays complete messages, or plays a previously recorded audio and/or video message to the user. Upon completion of the display/play operation, the yellow note 109 returns to the idle state 301. A preferred yellow note application for use with the GUI is described in greater detail below.

Figure 3:
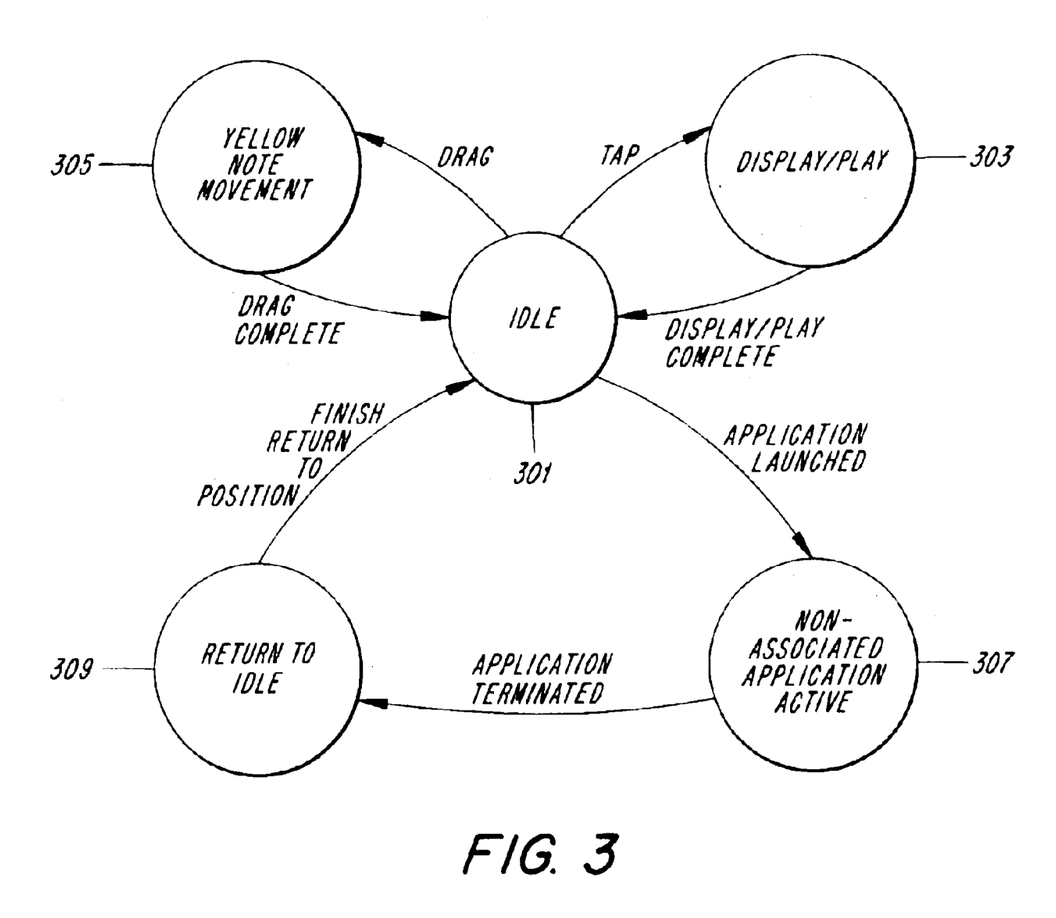
FIG. 3 is a state transition diagram that shows the high level design of a yellow note in accordance with an exemplary embodiment of the invention.

In response to a drag operation, the yellow note 109 enters a yellow note movement state 305, that permits the user to reposition the yellow note 109 on the main page 100 of the touch screen, possibly subject to certain restrictions, which will be described below. Upon termination of the drag operation, the yellow note 109 returns to the idle state.

In order to enhance the refrigerator metaphor, as well as to facilitate usage of the yellow notes 109, the yellow note movement state 305 can be designed to impose restrictions and other characteristics on the movement and display of yellow notes 109. These may include:

- If dragged to a position that is over a virtual magnet 107, the virtual magnet 107 is always depicted as being on top of the yellow note 109, and never the other way around.
- A yellow note 109 can be moved to a position that covers one or more other yellow notes 109, but in preferred embodiments, a default minimum vertical displacement is caused to exist which ensures that the time and date stamp on each note will always be visible.
- Upon being created, by default, a new yellow note 109 is placed above an older yellow note 109, so that if a user does not manually move the yellow note objects around, they will by default be placed in a vertical column with the newest note on top and the oldest on the bottom.

Another yellow note state, called the "non-associated application active" state 307, is entered in response to activation of an application other than the one the yellow note's own play/display application. In the "non-associated application active" state 307, the yellow note 109 is automatically removed from view, to make room for a subordinate page (described in greater detail below).

When the non-associated application is terminated (and no other non-associated applications are launched), the yellow note 109 leaves the "non-associated application active" state 307 and enters the "return to idle" state 309. The "return to idle" state 309 is a transitory state which serves only to return the yellow note 109 to the screen position that it had just prior to entering the "non-associated application active" state 305. After the yellow note 109 has returned to its former position on the main page 100, its state returns to the idle state 301.

As mentioned earlier, each virtual magnet 107 functions as an activation button for the various software applications that are made available to the user. An application is activated in response to a corresponding virtual magnet 107 being tapped by the user. The activation preferably happens in response to release of the finger (or other touching implement) from the surface of the touch screen. I preferred embodiments, only a single tap is required to launch an application.

Figure 4:
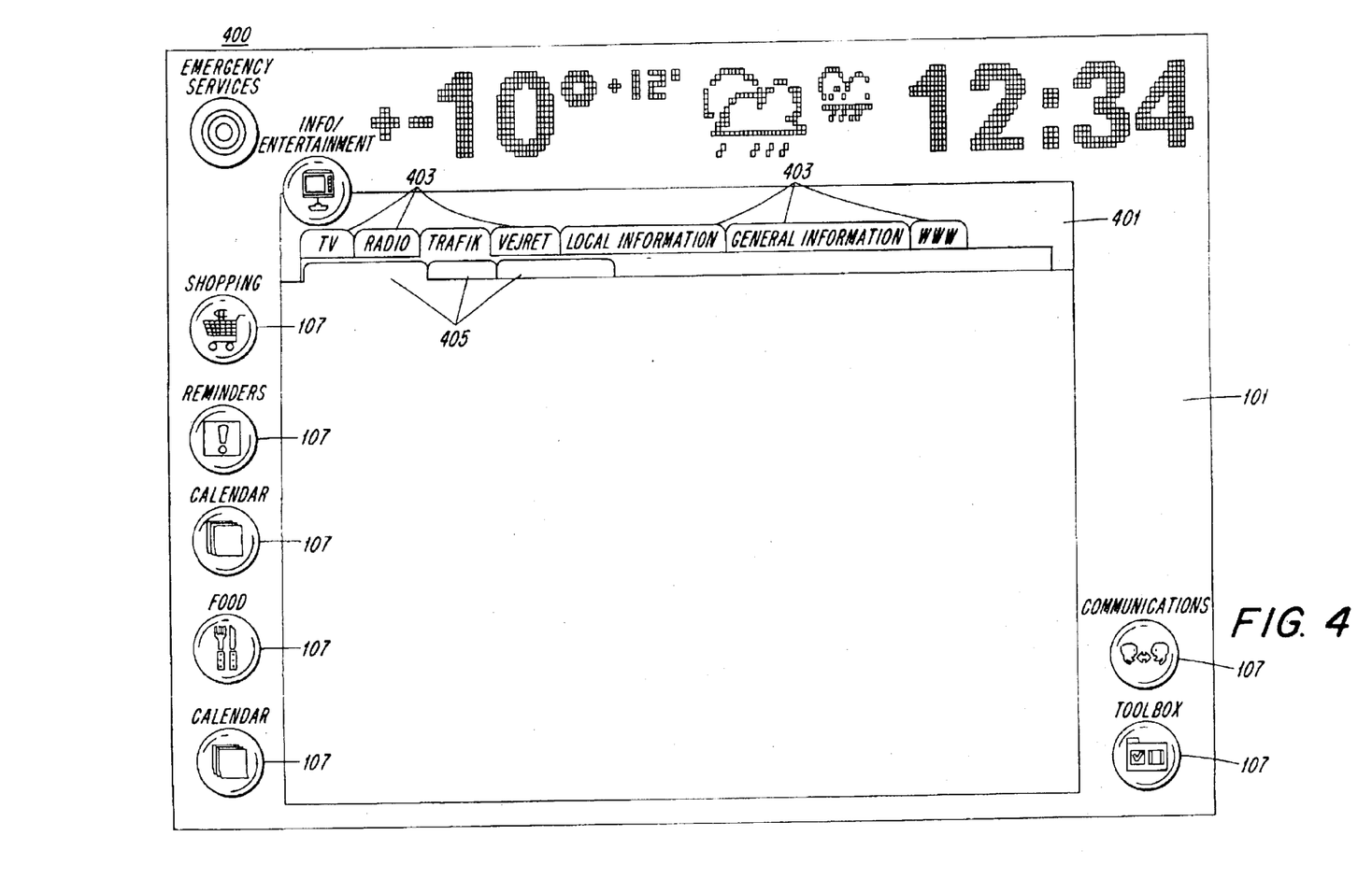
FIG. 4 depicts an exemplary embodiment of a subordinate page with an application window, in accordance with the invention.

When an application is activated (i.e., "launched"), the main page 100 changes so that an application "window" opens up in a subordinate page. An exemplary embodiment of a subordinate page 400 with an application window 401 is depicted in FIG. 4. In preferred embodiments, the application window 401 is a rectangular white area in which information can be displayed. If the application contains sub-menus, these are preferably accessed via "tabs" 403 that are displayed in a top portion of the rectangular area. A default sub-menu (e.g., the "Trafik" sub-menu) is then opened automatically, and the relevant tab 403 is highlighted to indicate the chosen sub-menu. The user can open any other sub-menu by tapping the screen area of the graphical representation of the relevant tab.

A sub-menu can, itself, have sub-menus, which are similarly accessed by means of tabs 405.

In preferred embodiments, the rectangular application window 401 covers more than half of the screen, and is placed below the area containing the general information (time/date and weather report, which remain permanently visible).

As mentioned earlier, whenever an application is activated, the yellow notes 109 disappear from the screen (see "non-associated application active" state 307) and the virtual magnets 107 (other than the one that launched this application) are automatically moved into default positions (see "non-associated application active" state 207), preferably in a vertical row situated alongside the application window 401. As for the virtual magnet 107 that launched this application window 401, it preferably moves to a top position of the rectangular application window 401. To enhance the refrigerator/magnet metaphor, this virtual magnet 107 is preferably depicted halfway covering some of the application window 401 and halfway covering some of the background area 101. In this way, the virtual magnet 107 will appear to be placed over or in front of the application window 401, which again by means of a thin outline and shadow effect can be made to seem to be in front of the background board. The metaphor is that the virtual magnet 107 is affixing the "paper" of the application window 401 to the board.

By arranging a subordinate page in this manner, all virtual magnets 107 will remain visible when an application is activated. This makes it possible to activate another application without first having to close down the currently activated application. Although it is not essential to the invention, in preferred embodiments, it is not possible to activate more than one application at a time. When a first application ("application A") is activated, the application window 401 is opened up displaying the information related to application A, including its submenus. If the user then wants to activate a second application ("application B"), this is done simply by tapping the screen surface location of the graphical representation of the virtual magnet 107 associated with application B. This results in an exchange of the virtual magnets "A" and "B" (e.g., either an immediate exchange, or alternatively one that is slow enough to create the illusion to the user that the two virtual magnets "A" and "B" are moving in order to exchange places), so that the virtual magnet 107 associated with application B will now be "holding" the application window 401, and the virtual magnet 107 associated with application A will return to its default place in the column beside the application window. At the same time, the information and the sub-menus displayed in the application window 401 change to information relating to the application B. In this way, either application A or application B is represented in the application window 401.

Although in alternative embodiments it could be possible, in preferred embodiments it is not possible to open up several application windows 401 on top of each other. Instead, the application window 401 is stable—only the content of the window changes.

If the user wants to return to the main page 100 (e.g., to be able to see the yellow notes 109), tapping once on the virtual magnet 107 associated with the currently activated application causes this to happen. The application window 401 will then disappear and the main page 100 is again visible. The main page 100 will appear as it was left at the time the application window 401 was opened. Thus, if the user has arranged virtual magnets 107 and yellow notes 109 in his or her personal way, this personal layout will appear again after closing down the application window 401.

One of the applications referred to repeatedly in this disclosure is the yellow note application. While it is not an essential feature of the GUI, in preferred embodiments the yellow note application is present because it enhances the refrigerator metaphor. Preferably, one of the virtual magnets 107 represents the yellow note application. Tapping on this virtual magnet 107 activates the application for creating new family messages. The preferred yellow note application offers the user the choice between creating a text message or creating an audio-visual message, either as video or as a voice message. (The selection of a video message may, of course, also include audio information.)

If the user chooses to create a text message, then a text area with a blinking cursor will appear and at the same time a graphical representation of a conventional computer/typewriter keyboard is displayed, preferably in the lower half of the screen. The user can then type in the text area by tapping on the touch screen keyboard with his fingers (or some other implement).

After having typed in the desired text message, the user completes the process by touching a predetermined one of the virtual keys, which may be given a suitable label such as "OK", "save" or "close". The touch screen keyboard will then disappear and a new yellow note will be visible on the main page 100 displaying the text message just typed in. In a predetermined portion of the yellow note (e.g., a top portion) is a time stamp, put there automatically by the computer system running the application to indicate the time and/or date of creation of the yellow note 109. To distinguish it from the message, the time stamp is preferably presented in a smaller font size than the text message, which may be displayed just bellow the time stamp. The yellow note 109 is visible at the main page 100, so that family text messages can be seen and read without opening any applications.

If the user chooses to create an audio-visual message, a set of icons representing "record", "stop", "pause" and "play" functions will appear instead of the virtual keyboard. By activating the "record" function, a built-in microphone, either alone or in conjunction with a built-in video camera, is used for recording a spoken message from the user. By activating "stop", the record function is stopped, and by activating "play", the user can check out the recorded message. By tapping on a button labeled "OK" (or some other suitable indicator), the application window will disappear, and there will appear a new yellow note 109 on the screen. If the message was recorded as a video message, the computer will automatically place a still photo from the video sequence on the note, below the automatically inserted time/date stamp. The still photo may, for example, be the first frame of the video message. If the user left only an audio message, the yellow note 109 will show an icon of a microphone.

The audio-visual note will be visible at the front-page level just like the text message. However, to hear/see the audio-visual message, one has to touch the displayed photo or microphone icon represented on the yellow note 109. Touching the photo/icon will cause the stored message to start playing in a screen window. In this window there can also be displayed icons/pictograms representing controls for "pause" and audio volume controls. If the user wants to see/hear the message again, he or she simply repeats the activation process described above.

The yellow notes 109 can also display a "delete" icon, which provides the user with a mechanism for deleting outdated or otherwise unwanted messages.

An "edit" icon can also be presented which provides a mechanism for the user to re-open the application and change the text or audio-visual message.

Figure 5:
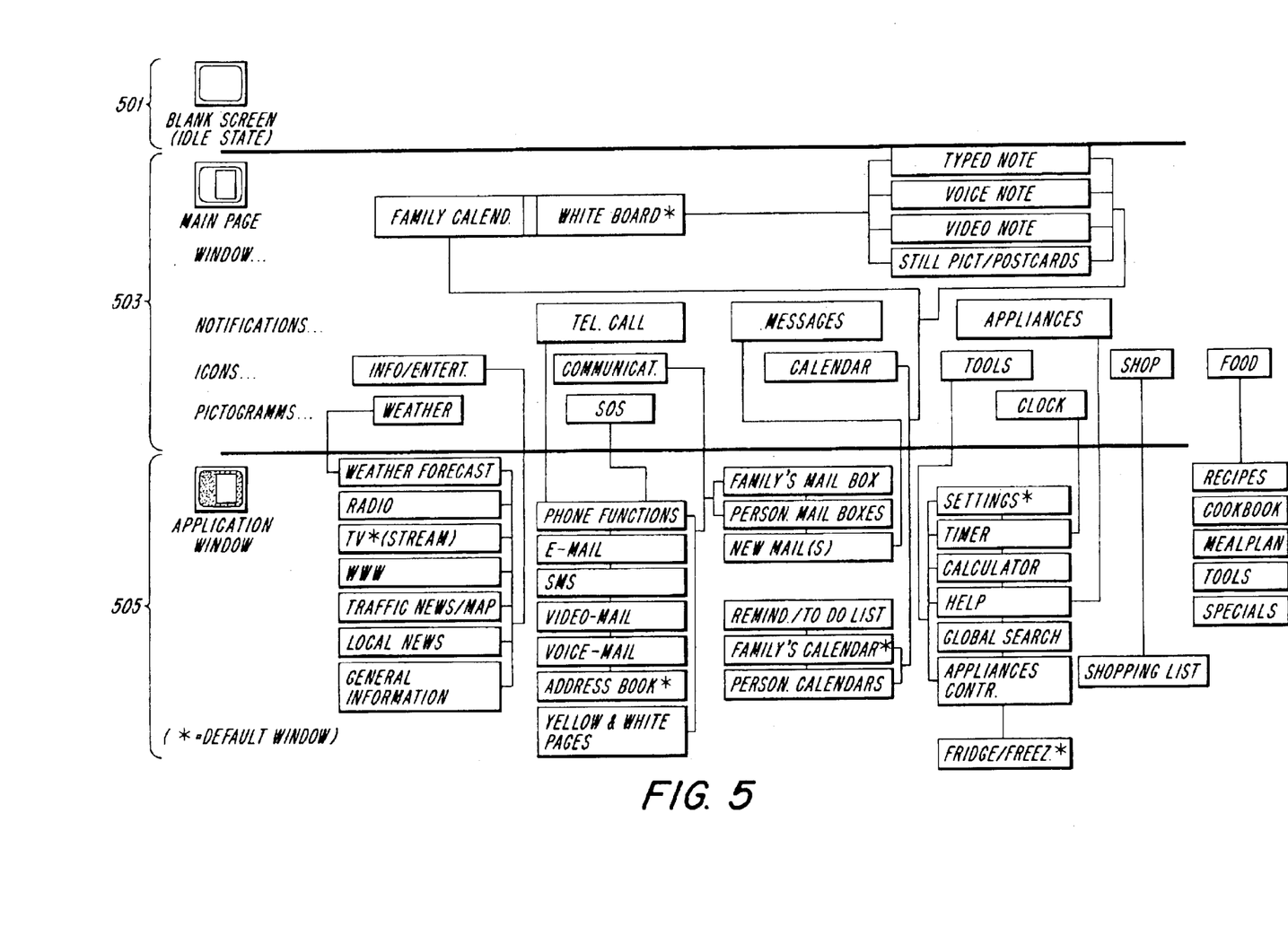
FIG. 5 is a block diagram of an exemplary organization of applications and their relation to the GUI in accordance with the invention.

The above discussion has so far described a GUI interface that is based on a refrigerator/magnet metaphor for providing a mechanism for interacting with home communications equipment in a way that feels natural and familiar to each household occupant. The virtual magnets 107 have been described, which in accordance with the invention exhibit magnet-like behavior (i.e., with respect to movement near and away from other virtual magnets 107) and are used to activate and de-activate various communications applications that may be made available. The description will now focus on an exemplary set of communications applications, and how they might be organized to provide a complete system that is accessible by means of the inventive GUI. An exemplary system is depicted in FIG. 5. Three display states are possible. In a system idle state 501, the screen is blank. The system idle state 501 is entered when no user has interacted with the touch screen for some predetermined period of time. The purpose of the system idle state 501 is to enable the system to conserve energy when it is not in use. This may be a requirement in jurisdictions that regulate the energy consumption of household appliances.

The touch screen leaves the system idle state 501 and enters the main page display state 503 when something comes in contact with it, such as a user's finger, or a sensor that detects an approaching user (e.g., a microphone plus associated logic that detects the sound of an approaching user, or a video camera plus associated logic that detects the image of an approaching user). The processor that controls the system may at this point start a timer whose function is to determine whether the screen has been touched within the predetermined period of time. If not, the system returns to the system idle state 501. While in the main page display state 503, the main page 100 is displayed, as described above. It can be seen from FIG. 5 that the user would be capable of seeing the pictograms that provide general information (e.g., weather and clock information). Another useful pictogram is an SOS button, which when pressed can invoke an application that immediately contacts predefined authority in case of an emergency (e.g., "911" service in the United States).

Also displayed on the main page 100 are various White Board items (e.g., any typed notes, voice notes, video notes, and/or still pictures and postcards) that may have been created by the various messaging applications that are available (e.g., a yellow note application). In addition, the main page 100 can display notifications that alert the user to the existence of incoming telephone calls, received email messages, and even problems or other status information associated household appliances (e.g., a notification that a dishwasher cycle has completed).

Furthermore, as described in detail above, the main page 100 displays one or more icons in the form of virtual magnets 107, which allow the user to activate any of the various applications that are loaded on the processor. In the exemplary embodiment, these applications are grouped into categories, such as: INFORMATION/ENTERTAINMENT; COMMUNICATIONS; CALENDAR; TOOLS; SHOPPING; and FOOD.

When an application is activated (by means of its corresponding virtual magnet 107), the system enters the application window display state 505, which means that the GUI displays the appropriate application window 401 in correspondence with which application or set of applications was selected. In the exemplary system organization depicted in FIG. 5, it can be seen that each category of applications has a number of associated applications that can be selected from the application window by the user. For example, the INFORMATION/ENTERTAINMENT group of applications may include: WEATHER FORECAST; RADIO; TELEVISION (TV) (STREAM); WORLD WIDE WEB (WWW); TRAFFIC NEWS/MAP; LOCAL NEWS; and GENERAL INFORMATION.

As indicated by the connecting lines in the figure, the COMMUNICATIONS group of applications may include such applications as TELEPHONE FUNCTIONS; E-MAIL; SHORT MESSAGE SERVICE (SMS—a service provided by GSM and other telephone systems); VIDEO-MAIL; VOICE-MAIL; ADDRESS BOOK; YELLOW & WHITE PAGE DIRECTORY SERVICES; FAMILY'S MAIL BOX; and PERSONAL MAIL BOXES.

As further indicated by the connecting lines in the figure, the CALENDAR group of applications may include such applications as FAMILY'S CALENDAR and PERSONAL CALENDAR. The TOOLS group of applications may include such applications as SETTINGS; TIMER; CALCULATOR; HELP; GLOBAL SEARCH; and APPLIANCE CONTROL (e.g., for controlling the refrigerator/freezer or other appliances). The SHOPPING group of applications is exemplified by a SHOPPING LIST application. The SHOPPING group of applications might further include, for example, an e-commerce application. Finally, the FOOD group of applications may include such applications as RECIPES; COOKBOOK; MEALPLAN; TOOLS; and SPECIALS.

The above-identified categories and applications are not intended to be an exhaustive list, nor are they intended to indicate a set of applications that must be included in the system. Rather, they are presented merely to show the possibilities of what types of applications would be useful for making the kitchen (or other room) a communications center for the house, and how they might be organized by the inventive GUI.

Figure 6:
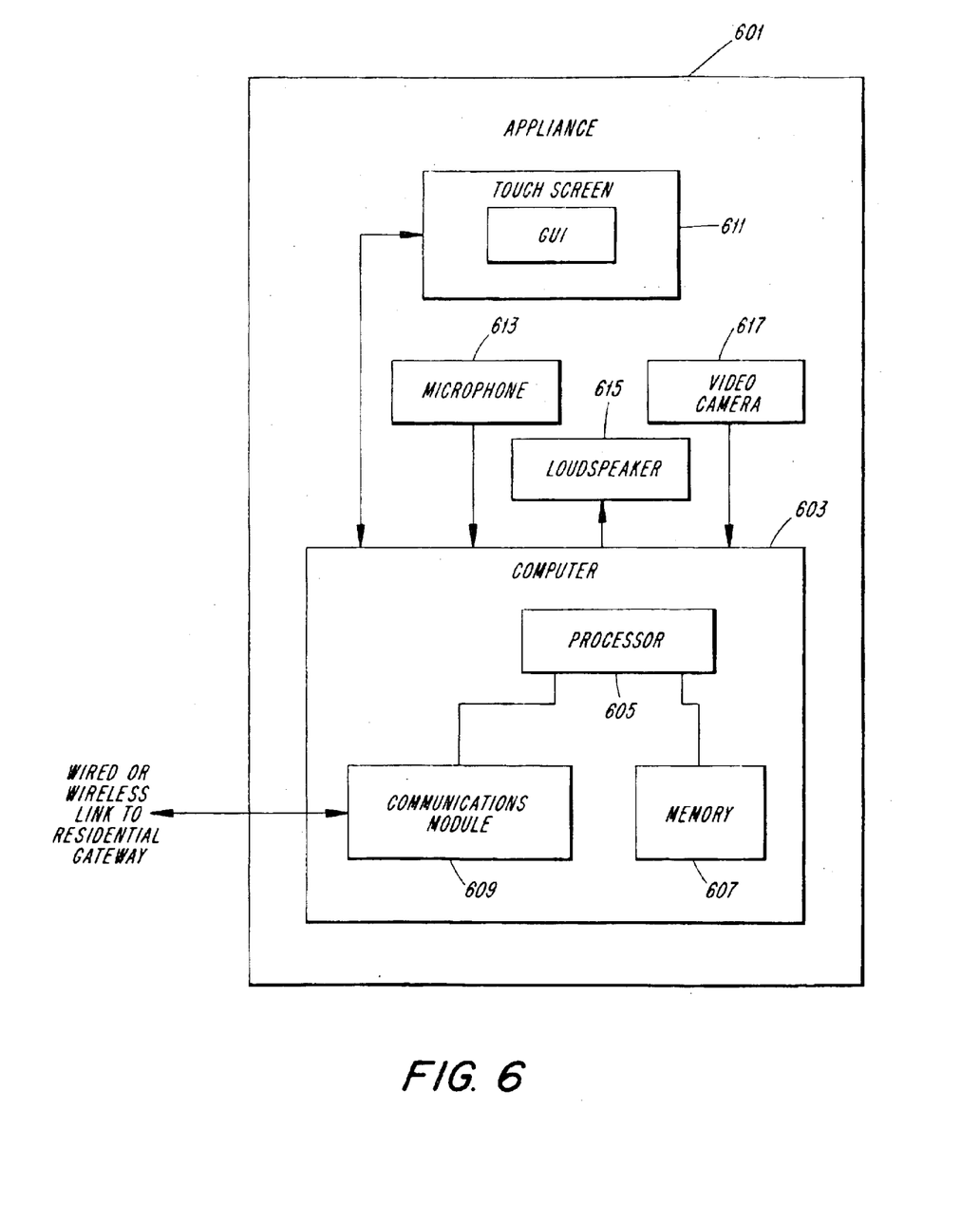
FIG. 6 is a block diagram of an exemplary embodiment of a system that incorporates the GUI based on a refrigerator metaphor.

FIG. 6 is a block diagram of an exemplary embodiment of a system that incorporates the GUI based on a refrigerator metaphor. The system is preferably mounted in or on an appliance 601, which may for example be a refrigerator or other kitchen appliance. However, this is not essential to practicing the invention. The appliance could alternatively be any appliance or cabinet used in the home or office. It could, for example, be a Cordless Screen Phone, such as those that are being developed by Ericsson, and are expected to become commercially available. Of course, the GUI is particularly well-adapted for use in a kitchen-like setting.

In addition to equipment (not shown) that might normally be associated with the appliance (e.g., refrigeration equipment), the appliance 601 includes a computer 603 for running the GUI and the one or more applications that can be accessed via the GUI. The computer 603 may therefore include a processor 605 which is coupled to a memory 607 and a communications module 609. The memory 607 stores the control program that creates and controls the GUI, and also stores the one or more application programs that can be accessed via the GUI.

Because one or more of the application programs may require a link to one or more communications networks, the system preferably also includes the communications module 609. The communications module 609 preferably provides a wireless connection to a residential gateway, a terminal or other appliances. In alternative embodiments, the connection may be wired. The residential gateway (not shown) can provide broadband service so that the various applications need not experience major delays when providing, for example, television or radio programming to the user. The communications module 609 can also serve as a vehicle for permitting appliance conditions and other status to be monitored by a remote unit, and also for receiving new or updated application programs to be stored in the memory 607. The application programs can be communication-related programs for direct use by the user, or they may be appliance specific programs for those instances in which the computer 603 is also used to control one or more aspects of the appliance itself.

The residential gateway (not shown) is preferably based on open industry standards, and delivers a connection to the outside world and to appliances in the home. The connection is preferably "Always On", with automatic configuration at power up. The gateway may also run other applications, and may further include memory for storing household occupant-related data.

The computer is connected to a screen 611, which is preferably a color touch screen for displaying the GUI to the user, and for receiving the user's touch commands. The screen 611 is preferably mounted at a prominent position on the appliance so that it can be readily available to the user. For example, in embodiments in which the appliance is a refrigerator, the screen 611 is preferably mounted on the door of the refrigerator.

The computer may further be connected to other input and/or output devices, such as a microphone 613, a loudspeaker 615, and a video camera 617.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, numerous references have been made to "yellow notes" throughout the specification. However, it will be readily apparent to one skilled in the art that the actual color of the note is not an essential aspect of-the invention. Rather, the term "yellow note", as used throughout this specification including the claims, is intended to refer to any image that appears to the user as a familiar type of note paper, regardless of color, shape or size. While the "yellow notes" depicted herein are rectangular in shape, even this is not an essential feature of the invention, which can easily accommodate a note image of any shape.

Also, the above-described embodiments included notifications on the main page 100 that alert the user to the existence of incoming telephone calls, received email messages. However, in alternative embodiments, such notifications could be displayed in other manners. For example, an incoming email message could be displayed as an envelope that appears to be "held" to the background by one of the virtual magnets 107 (e.g., the COMMUNICATIONS magnet). In another alternative, the user could be alerted to the presence of an incoming email message, telephone message, and the like by displaying a suitable alerting message (e.g., "You have an email message") next to a corresponding virtual magnet 107 (e.g., the COMMUNICATIONS magnet).

In yet another alternative, in response to the existence of a notification for the user, the inventive GUI could cause a virtual magnet 107 to appear to move around the background, for the purpose of drawing the user's attention to the GUI, and more particularly to the virtual magnet 107.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a graphical user interface comprising:
   displaying a background on a touch screen;
   displaying a first virtual magnet on the background;
   relocating the first virtual magnet from a first location on the background to a second location on the background in response to a drag operation performed on the first virtual magnet by a user;

activating an application program in response to a tap operation performed on the first virtual magnet by the user;

displaying an application window on the background in response to the tap operation performed on the first virtual magnet by the user; and moving the virtual magnet from a main page location to an application window location in response to the tap operation performed on the first virtual magnet by the user, wherein the application window location is such that part of the virtual magnet covers a portion of the application window and a remaining part of the virtual magnet covers a portion of the background, thereby creating the illusion that the virtual magnet is affixing the application window to the background.

2. The method of claim 1, further comprising:

in response to a second tap operation performed on the first virtual magnet by the user, performing the following:

terminating the application;

removing the application window from the background; and returning the first virtual magnet to the main page location.

3. The method of claim 1, further comprising:

displaying a second virtual magnet on the background; and moving the second virtual magnet from a second main page location to a location that is alongside the application window in response to the tap operation performed on the first virtual magnet by the user.

4. The method of claim 3, further comprising:

returning the second virtual magnet to the second main page location in response to a second tap operation performed on the first virtual magnet by the user.

5. The method of claim 1, wherein the step of displaying the application window comprises making the application window look like a sheet of paper.

6. The method of claim 1, wherein the step of displaying the application window comprises making the application window look like a plurality of sheets of paper, wherein each one of the sheets of paper has a tab portion that indicates one of a corresponding plurality of applications that can be activated.

7. The method of claim 1, further comprising:

displaying a second virtual magnet on the background; and generating a predetermined sound when a peripheral region of the first virtual magnet comes into contact with a peripheral region of the second virtual magnet.

8. A method of operating a graphical user interface comprising:

displaying a background on a touch screen;

displaying a first virtual magnet on the background;

relocating the first virtual magnet from a first location on the background to a second location on the background in response to a drag operation performed on the first virtual magnet by a user;

activating an application program in response to a tap operation performed on the first virtual magnet by the user;

displaying a second virtual magnet on the background; and causing the first and second virtual magnets to repel one another when a peripheral region of the first virtual magnet is less than a predetermined distance from a peripheral region of the second virtual magnet, whereby the first and second virtual magnets are moved such that they are at least the predetermined distance away from each other.

9. The method of claim 8, further comprising:

associating a first mass with the first virtual magnet; and associating a second mass with the second virtual magnet, wherein a speed of movement of the first virtual magnet when the first and second virtual magnets are caused to repel one another is a function of how massive the first virtual magnet is relative to the second virtual magnet.

10. The method of claim 9, wherein the first mass is a function of how many functions are associated with the first virtual magnet.

11. The method of claim 9, wherein the first mass is a constant.

12. The method of claim 9, further comprising:

receiving a user input that determines the first mass.

13. The method of operating a graphical user interface comprising:

displaying a background on a touch screen;

displaying a first virtual magnet on the background;

relocating the first virtual magnet from a first location on the background to a second location on the background in response to a drag operation performed on the first virtual magnet by a user;

activating an application program in response to a tap operation performed on the first virtual magnet by the user;

displaying a second virtual magnet on the background; and causing the first and second virtual magnets to attract one another when they are within a predetermined distance from one another, whereby the first and second virtual magnets are moved such that a peripheral region of the first virtual magnet is in contact with a peripheral region of the second virtual magnet.

14. The method of claim 13, further comprising:

associating a first mass with the first virtual magnet; and associating a second mass with the second virtual magnet, wherein a speed of movement of the first virtual magnet when the first and second virtual magnets are caused to attract one another is a function of how massive the first virtual magnet is relative to the second virtual magnet.

15. The method of claim 14, wherein the first mass is a function of how many functions are associated with the first virtual magnet.

16. The method of claim 14, wherein the first mass is a constant.

17. The method of claim 14, further comprising:

receiving a user input that determines the first mass.

18. The method of claim 1, further comprising:

using the application program to create a text message; and displaying the text message on a yellow note that appears on the background.

19. The method of claim 1, further comprising:

using the application program to create an audio message; and displaying a yellow note on the background, wherein the yellow note includes an icon that indicates that the audio message has been recorded.

20. The method of claim 19, further comprising:
playing the audio message in response to a tap operation performed on the yellow note by the user.

21. The method of claim 1, further comprising:
using the application program to create a video message;
displaying a yellow note on the background; and
displaying a first frame of the video message on the yellow note.

22. The method of claim 21, further comprising:
playing the video message in response to a tap operation performed on the yellow note by the user.

23. The method of claim 1, further comprising:
displaying a notification of an incoming message on the background, wherein the notification is made to appear like an envelope that is held to the background by the first virtual magnet.

24. The method of claim 1, further comprising:
displaying a notification of an incoming message, wherein the notification is made to appear as text that is displayed adjacent to the first virtual magnet.

25. The method of claim 1, further comprising:
causing the first virtual magnet to move on the background in response to a status condition of which the user should be notified.

26. The method of claim 25, wherein the status condition is receipt of an incoming email message.

27. The method of claim 25, wherein the status condition is receipt of an incoming telephone message.

28. A graphical user interface comprising:
a background;
a first virtual magnet that is displayed on the background;
logic that relocates the first virtual magnet from a first location on the background to a second location on the background in response to a drag operation performed on the first virtual magnet by a user;
logic that activates an application program in response to a tap operation performed on the first virtual magnet by the user;
logic that displays an application window on the background in response to the tap operation performed on the first virtual magnet by the user; and
logic that moves the virtual magnet from a main page location to an application window location in response to the tap operation performed on the first virtual magnet by the user, wherein the application window location is such that part of the virtual magnet covers a portion of the application window and a remaining part of the virtual magnet covers a portion of the background, thereby creating the illusion that the virtual magnet is affixing the application window to the background.

29. The graphical user interface of claim 28, further comprising:
logic that terminates the application, removes the application window from the background, and returns the first virtual magnet to the main page location in response to a second tap operation performed on the first virtual magnet by the user.

30. The graphical user interface of claim 28, further comprising:
a second virtual magnet; and
logic that moves the second virtual magnet from a second main page location to a location that is alongside the application window in response to the tap operation performed on the first virtual magnet by the user.

31. The graphical user interface of claim 30, further comprising:
logic that returns the second virtual magnet to the second main page location in response to a second tap operation performed on the first virtual magnet by the user.

32. The graphical user interface of claim 28, wherein the application window is made to look like a sheet of paper.

33. The graphical user interface of claim 28, wherein the application window is made to look like a plurality of sheets of paper, wherein each one of the sheets of paper has a tab portion that indicates one of a corresponding plurality of applications that can be activated.

34. The graphical user interface of claim 28, further comprising:
a second virtual magnet that is displayed on the background; and
logic that generates a predetermined sound when a peripheral region of the first virtual magnet comes into contact with a peripheral region of the second virtual magnet.

35. A graphical user interface comprising:
a background;
a first virtual magnet that is displayed on the background;
logic that relocates the first virtual magnet from a first location on the background to a second location on the background in response to a drag operation performed on the first virtual magnet by a user;
logic that activates an application program in response to a tap operation performed on the first virtual magnet by the user;
a second virtual magnet that is displayed on the background; and
logic that causes the first and second virtual magnets to repel one another when a peripheral region of the first virtual magnet is less than a predetermined distance from a peripheral region of the second virtual magnet, whereby the first and second virtual magnets are moved such that they are at least the predetermined distance away from each other.

36. The graphical user interface of claim 35, further comprising:
logic that associates a first mass with the first virtual magnet; and
logic that associates a second mass with the second virtual magnet,
wherein a speed of movement of the first virtual magnet when the first and second virtual magnets are caused to repel one another is a function of how massive the first virtual magnet is relative to the second virtual magnet.

37. The graphical user interface of claim 36, wherein the first mass is a function of how many functions are associated with the first virtual magnet.

38. The graphical user interface of claim 36, wherein the first mass is a constant.

39. The graphical user interface of claim 36, further comprising:
logic that receives a user input that determines the first mass.

40. A graphical user interface comprising:
a background;
a first virtual magnet that is displayed on the background;
logic that relocates the first virtual magnet from a first location on the background to a second location on the background in response to a drag operation performed on the first virtual magnet by a user;

logic that activates an application program in response to a tap operation performed on the first virtual magnet by the user;

a second virtual magnet that is displayed on the background; and logic that causes the first and second virtual magnets to attract one another when they are within a predetermined distance from one another, whereby the first and second virtual magnets are moved such that a peripheral region of the first virtual magnet is in contact with a peripheral region of the second virtual magnet.

41. The graphical user interface of claim 40, further comprising:

logic that associates a first mass with the first virtual magnet; and logic that associates a second mass with the second virtual magnet, wherein a speed of movement of the first virtual magnet when the first and second virtual magnets are caused to attract one another is a function of how massive the first virtual magnet is relative to the second virtual magnet.

42. The graphical user interface of claim 41, wherein the first mass is a function of how many functions are associated with the first virtual magnet.

43. The graphical user interface of claim 41, wherein the first mass is a constant.

44. The graphical user interface of claim 41, further comprising:

logic that receives a user input that determines the first mass.

45. The graphical user interface of claim 28, wherein:

the application program is a message application that creates a text message; and the graphical user interface further includes logic that causes the text message to be displayed on a yellow note that appears on the background.

46. The graphical user interface of claim 28, wherein:

the application program is a message application that creates an audio message; and the graphical user interface further includes logic that causes a yellow note to appear on the background, wherein the yellow note includes an icon that indicates that the audio message has been recorded.

47. The graphical user interface of claim 46, further comprising:

logic that plays the audio message in response to a tap operation performed on the yellow note by the user.

48. The graphical user interface of claim 28, wherein:

the application program is a message application that creates a video message; and the graphical user interface further includes logic that causes a first frame of the video message to be displayed on a yellow note that appears on the background.

49. The graphical user interface of claim 48, further comprising:

logic that plays the video message in response to a tap operation performed on the yellow note by the user.

50. The graphical user interface of claim 28, further comprising:

logic that displays a notification of an incoming message on the background, wherein the notification is made to appear like an envelope that is held to the background by the first virtual magnet.

51. The graphical user interface of claim 28, further comprising:

logic that displays a notification of an incoming message, wherein the notification is made to appear as text that is displayed adjacent to the first virtual magnet.

52. The graphical user interface of claim 28, further comprising:

logic that causes the first virtual magnet to move on the background in response to a status condition of which the user should be notified.

53. The graphical user interface of claim 52, wherein the status condition is receipt of an incoming email message.

54. The graphical user interface of claim 52, wherein the status condition is receipt of an incoming telephone message.

* * * * *